AUTOMATIC GAIN CONTROL

Filed May 3, 1954

INVENTORS.
RALPH M. W. JOHNSON,
QUENTIN C. McKENNA,
ERIC J. WOODBURY,

BY Henry Heyman

THEIR ATTORNEY.

United States Patent Office 2,853,601
Patented Sept. 23, 1958

2,853,601

AUTOMATIC GAIN CONTROL

Quentin C. McKenna, Manhattan Beach, Ralph M. W. Johnson, Los Angeles, and Eric J. Woodbury, Van Nuys, Calif., assignors to Hughes Aircraft Company, Culver City, Calif., a corporation of Delaware Application May 3, 1954, Serial No. 426,954

6 Claims. (Cl. 250—20)

Figure 1:
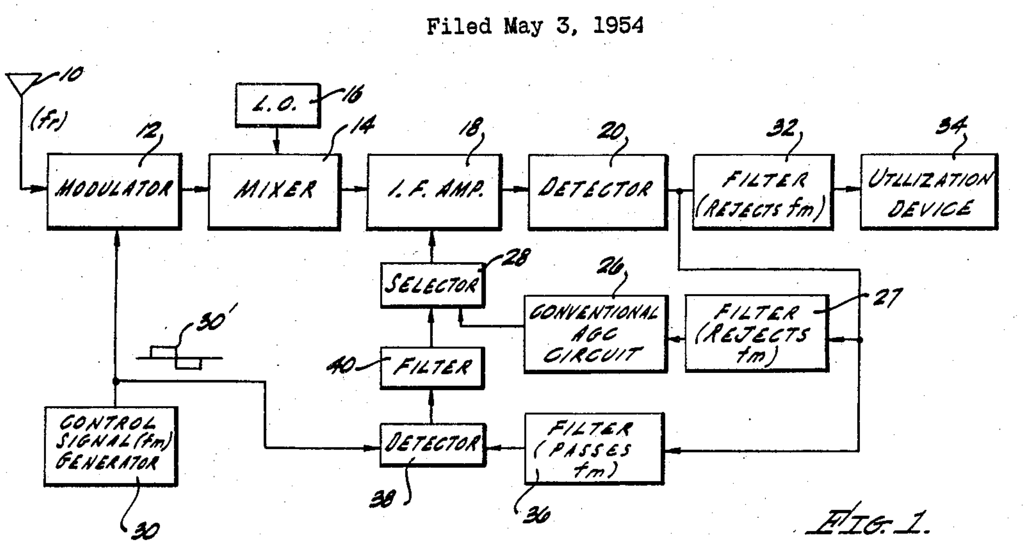

This invention relates to automatic gain control for radio receivers, and more particularly to an improved automatic gain control system which is substantially unaffected by internal noise, i. e., electrical noise generated in a receiver.

Generally only the received signals that exceed the internal noise level are utilized in a radio receiver system. However, in certain applications, the nature of the signals makes it possible to utilize them even in the presence of noise levels considerably higher than the signal level. Prior art AGC systems prevent the use of these relatively weak but useful signals because they respond to both the internal noise and the received signals. When the strength of useful received signals falls below a certain minimum, it is predominantly the noise that operates the AGC system. This results in insufficient gain to amplify the signals to the point where they can be utilized.

It is a principal object of this invention to provide a system for effecting automatic gain control of a radio receiver over a wider range of received signals than is realized with prior art automatic gain control system.

Another object of this invention is to provide an automatic gain control system which operates in response to received signals and independently of internal noise.

A further object is to provide an automatic gain control system which discriminates against internal noise and provides sufficient gain for relatively weak, but useful, received signals.

In accordance with this invention, the gain of the receiver is controlled only in response to the strength of the received signals. A signal of known frequency is utilized to additionally modulate the incoming signals before they are applied to the receiver. The result of this is that the waveform of the signal detected in the receiver is a composite of the modulation envelope of the signals as initially received and the added modulating signal. A signal of the frequency of the added modulating signal is extracted from the detected signal. This extracted signal is substantially proportional in amplitude to the strength of the incoming carrier and is utilized to control the gain of the receiver. Accordingly, the receiver gain is controlled solely by the received signals rather than by the combination of internal noise and the received signals.

This invention, both as to its organization and method of operation, together with further objects and advantages thereof, will be better understood from the following description considered in connection with the accompanying drawings, in which a preferred embodiment of the invention is illustrated by way of example, and its scope is pointed out in the appended claims.

Figure 2:
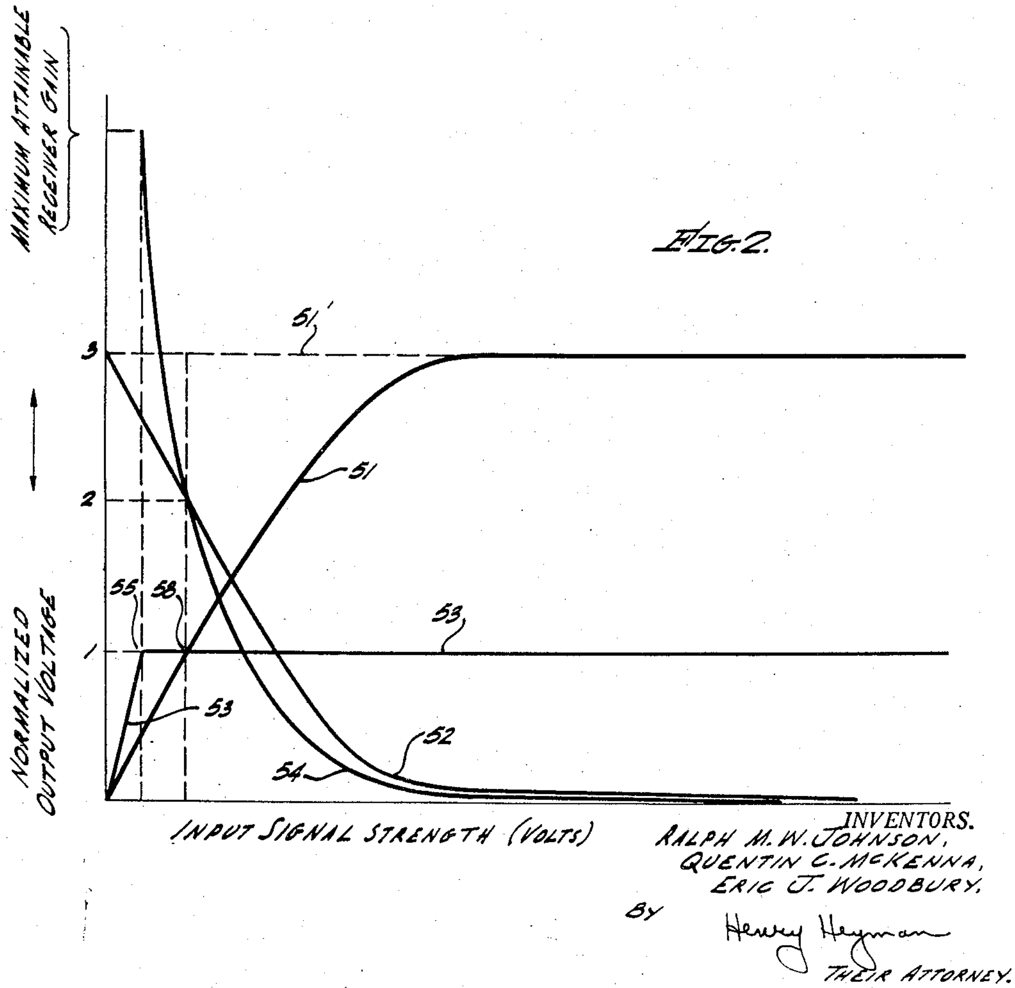

Referring to the drawings:

Fig. 1 is a block diagram illustrating the use of a controlled-modulation AGC system in conjunction with a conventional AGC system in a pulse receiver, and Fig. 2 illustrates output curves of signal and internal noise for receivers provided with either or both of the AGC systems of Fig. 1, to aid in explaining this invention.

The invention will be described in connection with a system for receiving amplitude-modulated pulses having a constant repetition rate, $f_r$. It will become obvious, however, that this invention may be used in any receiver system employing AGC in which the magnitude of useful received signals is comparable to or less than the magnitude of the internal noise.

Referring to Fig. 1, an antenna 10 is connected through a modulator 12 to a mixer 14. A local oscillator 16 is connected to mixer 14 to convert the carrier of the received pulses to an intermediate frequency. An intermediate-frequency amplifier 18 and detector 20 amplify and demodulate the signals from mixer 14. A conventional AGC circuit 26 is coupled to detector 20 through a filter 27; the purpose of filter 27 will be more fully explained hereafter. The D.-C. voltages derived from circuit 26 are applied to a selector network 28 which is connected to amplifier 18. Selector 28 is designed to respond to the larger of two D.-C. voltages applied to it.

A control signal generator 30 produces a cyclic signal of constant frequency, $f_m$, and impresses it on modulator 12. The control signal, shown as a square wave 30', thus additionally amplitude-modulates the incoming signal pulses. By normal operation of the receiver circuits above described, the output signal from detector 20 will comprise the modulation component of the received signals, with the added modulating signal, $f_m$, superimposed thereon.

The frequency $f_m$ preferably is not greater than half the recurrence frequency, $f_r$, of the received signals. Further, the waveform of the control signal is not critical; the square wave is shown merely as an aid to explain the present invention.

The filter 27 previously mentioned rejects the added modulating signal so that normal operation of AGC, circuit 26 will not be affected. Another filter 32 which also rejects the added modulating signal couples detector 20 to a utilization device 34, for example an indicator. It should be noted that filter 32 need not be employed where device 34 is insensitive to signals of the frequency $f_m$.

AGC for amplifier 18 is provided in accordance with this invention by rejecting the noise signals and developing D.-C. voltages proportional only to the strength of the received pulses. This is accomplished by extracting the component of the signals from detector 20 which is of the same frequency as the control signal. This component is a modulation product of the received signal and the added modulating signal, and its amplitude is proportional to the product of the amplitudes of said signals. Since the amplitude of the added modulating signal is constant, the amplitude of the extracted component is representative of the strength of the received signals. Accordingly, D.-C. voltages developed from said component are representative of the strength of the received signals.

Circuit means to accomplish the desired results comprises a filter 36 coupled to the output of the detector 20, a detector 38 for receiving signals passed by filter 36, and a filter 40 connected to detector 38 for deriving D.-C. voltages to be applied to selector 28.

In the combination above described, filter 36 has a sufficiently narrow pass band to reject all but the aforementioned component of the frequency $f_m$. In this case, detector 38 may comprise a simple rectifier, and a signal inverter if necessary, for developing negative D.-C. voltage pulses, whereby steady D.-C. voltages in the output of filter 40 will be of the proper polarity for controlling the gain of I.-F. amplifier 18.

A filter having the characteristics of filter 36, as above described, may be difficult to obtain in actual practice. However, it is a relatively simple matter to design and construct a filter which will pass some noise signals along with the added modulating signal, but which has a sufficiently narrow bandpass characteristic to restrict the noise to a fairly narrow range about the added modulating signal. The noise passed by the filter can be conveniently eliminated by a phase detector which can be controlled by a reference signal from generator 30 so as to respond solely to the added modulating signal. In this manner, noise signals, which are non-coherent with the added modulation signal, average out to zero and thus do not affect the output signals from detector 38. A suitable circuit for detector 38 may be a conventional phase detector adapted to operate so that it detects only signals which are in phase with the reference signal.

In the arrangement above described, the conventional AGC system is an auxiliary system to insure gain control action under certain conditions where controlled-modulation AGC may be lost. Cooperation between the two systems will be described in connection with Fig. 2.

Referring to Fig. 2, curves 51 and 52 illustrate, respectively, signal and internal noise in the output of a receiver employing conventional AGC. The noise and signal combine to maintain the total output voltage constant, as indicated by the dash line 51'.

Curves 53 and 54 illustrate the output signal and internal noise, respectively, in a receiver employing controlled-modulation AGC. The output signal level is constant for input signals above a minimum strength. Below this minimum, indicated at point 55, the noise remains at a maximum value that is determined by the maximum attainable gain of the receiver.

The respective sets of curves 51, 52 and 53, 54 further illustrate the manner in which both AGC systems are adapted to cooperate in the same receiver. A normalized output voltage scale indicates a signal output of unity to be maintained by controlled-modulation AGC. An output signal voltage level 3 is established for the receiver as it would be controlled by conventional AGC. Assume a corresponding 1-volt delay bias for the controlled-modulation AGC system and a corresponding 3-volt delay bias for the conventional AGC system. Since the input signal voltage will overcome the delay bias of one volt first, controlled-modulation AGC will maintain the output signal at the level unity.

A sudden increase in input signal strength of sufficient duration may saturate the receiver. Saturation will cause the added modulating signal to be "wiped off." The control voltage developed by controlled-modulation AGC will drop to zero, thus tending to further increase the receiver gain. But in this event, the 3-volt delay bias of the conventional AGC system will be overcome, and that system will then operate to bring the output signal back to level 3. As soon as the conventional AGC system performs this function, its output control voltage returns to zero, i. e., the input to this system at level 3 is 3 volts, which is balanced by the 3-volt delay bias. But the same 3 volts input is also applied to the 1-volt delayed controlled-modulation AGC system; thus, this system will resume operation and bring the output signal from level 3 back to level unity.

In a receiver equipped with both types of AGC, the controlled-modulation AGC system does not maintain the output signal voltage at unity level for input signals down to point 55. Instead, the use of both systems slightly restricts the effectiveness of controlled-modulation AGC. There is a point 58 at which, although the input signal voltage to both AGC systems is 1 volt, the voltage due to noise has a value of 2 volts, corresponding to level 2 on the normalized output voltage scale, i. e., the total input to the conventional AGC system is 3 volts. Since the noise will be even greater below this point 58, the 3-volt delay bias will be overcome to furnish gain control for the receiver. The output signal voltage then will not follow curve 53 down to point 55, but instead it will follow the signal curve 51 associated with the conventional AGC system.

The specific output signal levels 1 and 3 indicated in Fig. 2 should be understood to be illustrative conditions only. The levels and the difference between them would be chosen from a determination of factors peculiar to a particular type and use of a receiver, e. g., maximum attainable receiver gain, expected signal conditions, etc.

The controlled-modulation AGC system of this invention is not only insensitive to internally generated noise signals. It also nullifies the effects of circuits in the receiver which tend to reduce the magnitude of received signals. For example, base clipping of signals within the receiver causes an apparent reduction in signal amplitude, to which a conventional AGC system would respond. The controlled-modulation AGC system, however, controls the gain of amplifier 18 only in accordance with the added modulation, as previously described, and not the reduced signal amplitude.

Although this description has been restricted to gain control for an I.-F. amplifier of a pulse receiver, the system of this invention may be employed to control the gain not only of an I.-F. amplifier but also of other circuits (radio-frequency, I.-F., and converter tube circuits, for example) in pulse and other types of receivers.

From the foregoing description, it is evident that there has been described a novel system for controlling the gain of a radio receiver, so as to enable utilization of received signals over a wider range of signal levels than heretofore known.

What is claimed is:

1. In combination with an amplifier of carrier wave energy and a demodulator for said energy, a gain control system for varying the gain of the amplifier in accordance with the amplitude of the energy, comprising means for impressing a constant frequency signal upon the carrier wave energy before it is applied to the amplifier, automatic gain control means responsive to the output of said demodulator, means for deriving a component signal of said constant frequency from the output of said demodulator, means responsive to said component signal for developing a direct-current voltage representative of the magnitude of said component signal, and sensing means responsive to the voltage from said automatic gain control means and to the direct-current voltage for applying the larger of said voltages to the amplifier to control its gain.

2. In a radio receiver having a signal amplifier and a detector for demodulating signals appearing in the output of said amplifier, a gain control system comprising modulating means coupled to the input of said amplifier to impress a constant frequency signal upon received carrier waves before they are applied to said amplifier to cause a component signal of said constant frequency to be included in the output of said detector, a first filter coupled to the detector to pass substantially only said component signal, a second filter coupled to said detector to reject only said component signal, first and second voltage developing means coupled respectively to said first and second filters to develop unidirectional voltages representative of the portions of the output from said detector which are passed by said filters, voltage sensing means coupled to said first and second voltage developing means, and said voltage sensing means being connected to said amplifier to apply the greater of said unidirectional voltages to said amplifier to control its gain.

3. In a radio receiver of the type including an amplifier of modulated carrier wave energy and a detector for demodulating said carrier to obtain the modulation envelope, the combination comprising: means coupled to said amplifier to impress a constant frequency signal of substantially constant amplitude upon received energy before it is applied to the amplifier, whereby the output of the detector is a composite of said modulation envelope and said constant frequency signal and is dependent in amplitude upon said modulated carrier wave energy, automatic gain control means providing a direct-current voltage in response to the output of said detector, means for extracting a signal of said constant frequency from the output of said detector, means for deriving a direct-current voltage representative of the magnitude of said extracted signal, and means for applying the larger of said direct-current voltages to said amplifier to control its gain.

4. In a radio receiver including an amplifier of modulated carrier wave energy, a detector coupled to the amplifier to demodulate said energy and obtain the modulation envelope, wherein there is coupled to the output of the detector an automatic gain control system of the type which develops a gain control voltage for biasing the amplifier in accordance with signals applied to said amplifier, an additional gain control system comprising: means for impressing a constant frequency signal of substantially constant amplitude upon the received carrier wave energy prior to its being applied to the amplifier, means for extracting a signal of said constant frequency from the output of said detector, means for developing a direct-current voltage representative of the magnitude of said extracted signal, and sensing means coupled to the amplifier for receiving said direct-current voltage and the voltages from said system and applying to the amplifier the greater of such voltages.

5. In a receiver of modulated carrier wave energy provided with an amplifier and a demodulator for amplifying and demodulating the energy, a gain control system comprising: means coupled to the amplifier to additionally modulate the received energy with a constant frequency signal of constant amplitude before said energy is applied to the amplifier, modulating means coupled to the output of said demodulator for deriving a first direct-current voltage having a magnitude corresponding to the strength of the received energy, means coupled to the output of said demodulator for deriving a second direct-current voltage having a magnitude corresponding to the amount of modulation added to the received energy, and means coupled to the amplifier for applying the greater of said first and second direct-current voltages to the amplifier for controlling its gain.

6. In a receiver of modulated carrier wave energy having an amplifier and a demodulator, a gain control system comprising: means coupled to the input of the amplifier to additionally modulate the received energy with a constant frequency signal of substantially constant amplitude, whereby there is provided a modulation product proportional in amplitude to the received energy; means coupled to the output of said demodulator and responsive to frequencies excluding that of the constant frequency signal for deriving a first direct-current voltage having a magnitude corresponding to the strength of the received energy; means coupled to the output of said demodulator and responsive only to the constant frequency signal for deriving a second direct-current voltage having magnitude corresponding to the amount of modulation added to the received energy; means responsive to the second direct-current voltage and to said constant frequency signal to provide output signals only as the control signals and the second direct-current voltage are in phase, and means responsive to said last mentioned output signals and to said first direct-current voltage for applying the larger of such signals to the amplifier.

References Cited in the file of this patent

UNITED STATES PATENTS

| | | |
|---|---|---|
| 2,065,826 | Roosenstein et al. | Dec. 29, 1936 |
| 2,252,811 | Lowell | Aug. 19, 1941 |
| 2,477,028 | Wilkie | July 26, 1949 |